United States Patent
Kindred et al.

(10) Patent No.: US 8,213,899 B1
(45) Date of Patent: Jul. 3, 2012

(54) REAL TIME NETWORK DETERMINATION OF INTRA-CARRIER MOBILE TO MOBILE CALLS

(75) Inventors: Russell G. Kindred, Lake Quivera, KS (US); Charles E. Woodson, Peculiar, MO (US); Thomas M. Sladek, Overland Park, KS (US); Jim J. Dowell, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 672 days.

(21) Appl. No.: 11/634,432

(22) Filed: Dec. 5, 2006

(51) Int. Cl.
*H04M 11/00* (2006.01)
*H04M 3/42* (2006.01)
*H04M 15/00* (2006.01)

(52) U.S. Cl. ........ 455/406; 455/405; 455/408; 455/415; 379/114.27; 379/114.28; 379/114.29

(58) Field of Classification Search .................. 455/433, 455/405, 445, 406, 414.1, 415; 370/210; 379/114.27, 114.28, 114.29
See application file for complete search history.

(56) References Cited

U.S. PATENT DOCUMENTS

| | | | |
|---|---|---|---|
| 5,333,184 A | | 7/1994 | Doherty et al. ............. 379/115 |
| 5,740,239 A | * | 4/1998 | Bhagat et al. ............. 379/221.13 |
| 5,764,745 A | * | 6/1998 | Chan et al. ............. 379/221.13 |
| 5,883,948 A | * | 3/1999 | Dunn ..................... 379/221.09 |
| 6,240,293 B1 | * | 5/2001 | Koster ....................... 455/445 |
| 6,373,930 B1 | * | 4/2002 | McConnell et al. ...... 379/114.28 |
| 6,618,588 B1 | * | 9/2003 | Easley ...................... 455/433 |
| 6,639,978 B2 | * | 10/2003 | Draizin et al. ........... 379/114.21 |
| 6,697,469 B1 | * | 2/2004 | Koster ...................... 379/114.29 |
| 6,865,391 B1 | | 3/2005 | Oh et al. ................. 455/445 |
| 6,879,833 B2 | | 4/2005 | Oh et al. ................. 455/445 |
| 6,947,540 B2 | * | 9/2005 | Madoch et al. ......... 379/220.01 |
| 7,154,901 B2 | * | 12/2006 | Chava et al. ............. 370/401 |
| 7,542,559 B1 | * | 6/2009 | Donnachaidh et al. .. 379/221.08 |
| 2003/0179857 A1 | | 9/2003 | Conn et al. ................. 379/1.01 |
| 2003/0190015 A1 | * | 10/2003 | McCulley et al. ............. 379/9 |
| 2004/0156495 A1 | * | 8/2004 | Chava et al. ............. 379/392 |
| 2004/0203641 A1 | * | 10/2004 | Hazlewood ............. 455/414.1 |
| 2005/0027688 A1 | * | 2/2005 | Brady et al. .................. 707/3 |
| 2006/0025109 A1 | * | 2/2006 | Levitan ....................... 455/406 |
| 2006/0030357 A1 | * | 2/2006 | McConnell et al. ........ 455/554.1 |
| 2006/0258329 A1 | * | 11/2006 | Gruchala et al. ........... 455/405 |

OTHER PUBLICATIONS

"Pre-Paid Charging Enhancements for Circuit-Switched Data and Short Message Services", 3rd Generation Partnership Project 2 "3GPP2", X.S0010.A Version 1.0 (Jan. 5, 2004).

* cited by examiner

*Primary Examiner* — Jinsong Hu
*Assistant Examiner* — Opiribo Georgewill

(57) ABSTRACT

Methods are disclosed for identifying the carrier to which a phone, such as a mobile phone, subscribes in real time, at the time a call is originating from or terminating to the mobile phone. Where both parties to a call are subscribers to the same carrier, the methods can be used for applying preferential call rates to intra-carrier calls, e.g., making the calls free. The methods are particularly useful in the telephony networks with local number portability, in which the mere identification of the phone number does not necessarily identify the carrier to which the phone subscribes. The methods can use either existing databases to identify the carrier, such as LERG (Local Exchange Routing Guide) tables, number portability databases, name databases, and home location registers, or a new database can be created correlating mobile phone directory numbers with carriers.

5 Claims, 7 Drawing Sheets

| MDN | CARRIER ID |
|---|---|
| 360-301-0000 | 1 |
| 360-301-0001 | 1 |
| 360-301-0002 | 2 |
| 360-301-0003 | 5 |
| 360-301-0004 | 3 |
| . . . . . | . . . . . |

KEY: 1 = SPRINT
2 = VERIZON
3 = T MOBILE
4 = XCINGULAR
5 = AT&T
ETC.

FIG. 2

LERG TABLE

| PHONE NUMBER BLOCK | CARRIER ID |
|---|---|
| 312-612-0000 TO 612-1500 | SPRINT |
| 312-613-3000 TO 613-4000 | VERIZON |
| 316-751-5000 TO 751-6000 | XCINGULAR |
| . . . . . | . . . . . |

FIG. 3

REAL TIME NETWORK DETERMINATION OF INTRA-CARRIER MOBILE TO MOBILE CALLS

BACKGROUND

A. Field

This invention relates to the field of telephony and more particularly to methods for determining, in real time, the identity of the carrier that a calling or called party subscribes to, and also whether the call is from or to a mobile phone. For example, the methods are useful for determining whether a call is a mobile-to-mobile call and whether it is an intra-carrier call, that is, a call in which both the calling party and the called party subscribe to the same wireless service provider.

B. Related Art

Identification of intra-carrier mobile-to-mobile calls in real time has become more difficult in recent years in view of the advent of networks which merge CDMA wireless technology with legacy GSM wireless technology and the different technologies and protocols which are used in such hybrid systems. The identification of intra-carrier mobile-to-mobile calls is further complicated due to the impact of federally mandated so-called "local number portability," in which a wireless subscriber is able to keep their same phone number when they switch their wireless service from one carrier to another.

Prior art of interest includes U.S. Patent Application Pub. No. 2003/0179857, which describes a telephone communications network which applies special call treatment during call setup based on whether the calling and called parties both subscriber to the same carrier. See also U.S. Pat. No. 5,333,184, which relates to service plans in which discounts may be applied to calls made by parties which subscribe to the same telephone service provider as the called party. Other prior art of interest includes U.S. Pat. No. 6,865,391, which discloses that a wireless carrier may distinguish how it sets up a particular call for a subscriber depending on whether the other party to the call is also a wireless device. U.S. Pat. No. 6,373,930 relates to processing of pre-paid calls for wireless devices.

This invention provides robust, real-time methods by which a call processing entity in a wireless telephone network infrastructure determines the identity of the carrier to which a called or calling party subscribes (or, equivalently, carrier identification for a phone used by the called or calling party). The call processing entity can thereby determine whether a call is a mobile-to-mobile call between mobile phones that subscribe to the same carrier. Identification of intra-carrier mobile-to-mobile calls allows the carrier to provide special services for the callers. Some examples of the services are different call rating (i.e., fee structure for the call), making the call a free call, and performing different routing for the call. Also, in other situations, the identity of the other carrier, and perhaps a determination of whether the call is originating from a land line or a mobile phone, may allow other procedures to be invoked, such as for example providing a discounted call rating under certain circumstances, such as where a land line phone subscribing to Carrier X is used to call a mobile phone subscribing to Carrier Y.

SUMMARY

According to one embodiment of this invention, methods are provided by which a call processing entity in a telephone network determines, in real time (i.e., during the time in which the call is being set up) the identity of a carrier which provides communications services for one of the parties to the call. This call processing entity may be embodied in various platforms, such as for example a Service Control Point (SCP) in a wireless intelligent network (WIN), or a processor or workstation functioning as a rating engine determining charge rates for a call. The call processing entity includes or has access to one or more databases that it references to identify the carrier.

The methods of identification of the carrier serving a party to a call can take several forms, including one embodiment in which the call processing entity dips into a single master database which relates mobile phone directory numbers to carriers. Alternatively, the methods may involve multiple sequential dips into different tables or databases and application of an algorithm or logic to determine the carrier, and consequently, whether both parties to a call are served by the same carrier.

One aspect of the invention can be characterized as an improvement to a wireless telephony network having infrastructure for placement of calls between mobile phones. The improvement takes the form of a machine readable memory storing a database containing a list of mobile phone directory numbers and, for each entry in the list, a carrier identifier. This database is referred to herein as the "master database." The carrier identification may take the form of a number, code, or other data, or the carrier name itself. The carrier identifier identifies a carrier that is associated with a mobile phone directory number. The master database contains entries for mobile phones which subscribe to a plurality of different providers of telecommunications services. The master database is updated when a user of a mobile phone subscribes to a new carrier and the number is ported to the new carrier. Such provisioning of the master database with new information can be performed by the carriers in any convenient fashion. The carrier identifiers would preferably include mobiles subscribing to virtual network operators, i.e., companies that do not own a licensed frequency spectrum, but rather resell wireless services under their own brand name, using the network of another carrier. Alternatively, the identification of mobile virtual network operators may be identified by reference to a second database similar in structure to the "master database."

A further refinement of this aspect of the invention would be that the infrastructure of the telephony network includes a processing unit, e.g., service control point or rating engine, which consults the database to determine whether a call between two mobile phones is between mobile phones which subscribe to the same carrier. If so, a particular call processing or handling may occur, such as preferential charge rates, "free minutes" or other.

In another aspect, a method is provided for identifying the carrier to which a user of a phone subscribes which uses existing database and/or table resources rather than a new "master database." In particular, the method includes the steps of: (a) identifying a directory number of the phone (e.g., Mobile Directory Number, which may take the form of area code and phone number); (b) consulting a table, such as a Local Exchange Routing Guide (LERG) table, to determine which carrier was assigned a block of telephone numbers which includes the directory number identified in step (a); (c) determining that the directory number is portable between carriers, e.g., by reference to a number portability table; (d) obtaining a location routing number for the phone; and (e) comparing the location routing number to a list of location routing numbers that is associated with a carrier and identifying the carrier from such comparison. For example, in step (e), a carrier such as Sprint may maintain a list of location routing numbers for all its subscribers. If the location routing number obtained in step (d) is in the Sprint list, then the call processing entity (e.g., SCP) implementing the method identifies the carrier for the phone as Sprint.

In a situation where a location routing number does not distinguish between a virtual operator and the carrier whose network the virtual operator uses, the method may further include a step of consulting a further database to determine the identity of the virtual operator to which the phone is a subscriber.

In one embodiment, steps (a)-(e) are initiated in response to an originating or termination intelligent network trigger event at a mobile switching center. The performance of steps (a)-(e) can be performed in real time during the set-up of the call, e.g., by a service control point that is triggered in response to the intelligent network triggering event.

In another embodiment, a method is provided for identifying the carrier to which a user of a mobile phone subscribes using a home location register (IMR). The method includes the steps of: (a) identifying a directory number of the mobile phone, (b) consulting a table (e.g., LERG table) to determine which carrier was assigned a block of telephone numbers which includes the directory number; (c) determining that the directory number is portable, e.g., by reference to a number portability database; and (d) querying a home location register (HLR) database to determine the current carrier of the mobile phone.

Steps (a)-(d) can also be initiated in response to an originating or termination intelligent network trigger event at a mobile switching center. The performance of steps (a)-(d) can be performed in real time during the set-up of the call, e.g., by a service control point that is triggered in response to the intelligent network triggering event.

In still another embodiment, a method is provided for identifying an intra-carrier call between first and second mobile phones in real time during a call, comprising the steps of: (a) triggering a call to a service control point; (b) the service control point determining the name of the subscriber associated with the second mobile phone; and (c) the service control point querying a name database for a carrier to which the first mobile phone subscribes to determine whether the name determined in step (b) is in the name database, whereby if the name determined in step (b) is in the database the call is identified as an intra-carrier call.

In still another aspect, a method of identifying a carrier for a mobile phone having a mobile phone directory number (MDN) makes use of a home switch identifier to identify the carrier of the mobile phone. The method includes the steps of:

(a) obtaining the MDN from a service control point in a wireless intelligent network;

(b) querying a local number portability database with the MDN;

(c) if a location routing number (LRN) is returned from the query of the local number portability database, querying an other common carrier MDN database with the LRN and returning a home switch identifier;

(d) if a LRN is not returned from the query of the local number portability database, querying a first carrier MDN database and returning a home switch identifier; and (e) returning the home switch identifier returned in either step c) or step d) to the service control point, and (f) providing the home switch identifier to a rating engine to identify the carrier.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 2 is a more detailed illustration of one possible form of the "master database" of FIG. 1.

FIG. 3 is more detailed illustration of one possible form of the LERG table of FIG. 1, with extraneous information which may be present in the table omitted in order to not obfuscate the present disclosure.

DETAILED DESCRIPTION OF PREFERRED EMBODIMENTS

Overview

Methods are disclosed for identifying the carrier to which a phone subscribes in real time, i.e., at the time of set-up of a call originating from or terminating to the phone. The methods are particularly useful where a call is placed between two mobile phones, and resolves difficulties presented in hybrid GSM/CDMA networks and local number portability.

Where both parties to a call are subscribers to the same carrier, as can be determined by the present inventive methods, the carrier can applying preferential call rates to intra-carrier calls, e.g., making the calls free, or not decrementing the time of the call against the parties' minutes in their service plan.

In several embodiments, the methods use existing databases to identify the carrier, such as LERG (Local Exchange Routing Guide) tables, number portability databases, name databases, and home location registers, as described in more detail below. In an alternative embodiment, a new database ("master database"), is created and maintained which correlates mobile phone directory numbers to carriers. In one possible example, the call processing entity (e.g., Service Control Point) handling origination triggers for a calling party (subscriber to a given carrier) could dip into a carrier database to see if the called party's local routing number is the carrier's as well. If the called party's number is not in the carrier's local routing number database, then the carrier could dip into a second database (e.g., an industry-maintained database) to determine which carrier serves the other party.

Figure 1:
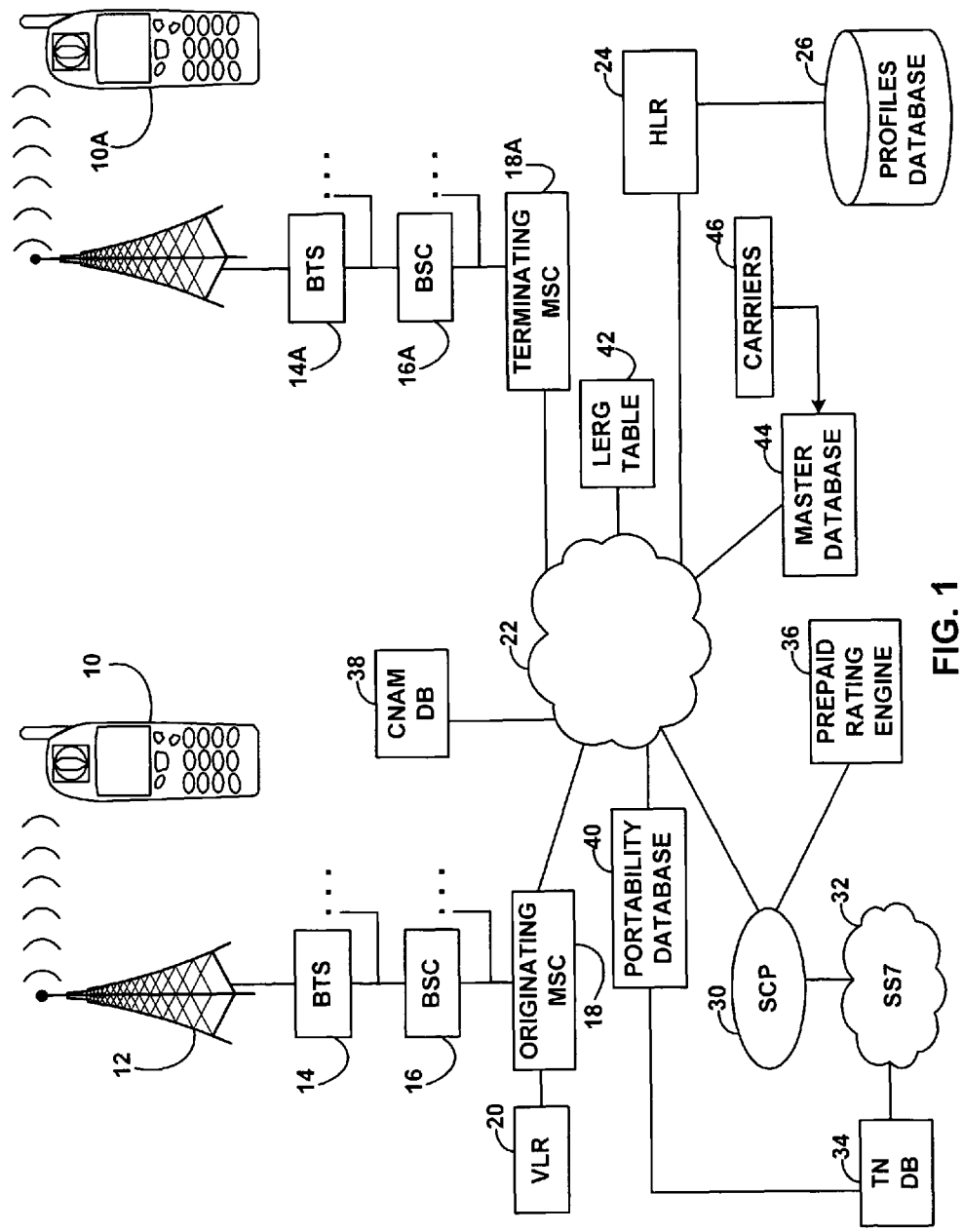
FIG. 1 is an illustration of a network environment showing the entities which may be used in accordance with presently preferred embodiments.

Referring now to the Figures, FIG. 1 is a diagram of a wireless intelligent network environment showing the various entities which may be used to identify mobile-to-mobile intra-carrier calls. A subscriber wireless device (e.g., mobile phone) 10 accesses a wireless communications network of their own carrier via a base station antenna 12, base transceiver station 14, base station controller 16 and a mobile switching center 18 (MSC). The MSC 18 is associated with a visitor location register 20, which may be co-located with the MSC 18. These details are conventional. The MSC 18 and the visitor location register 20 may function as a serving system, for example in a situation where the device 10 seeks to initiate a data or voice call to some other phone 10A, which may or not be also a subscriber to the same carrier as that of phone 10.

When the telephone 10 registers with the MSC 18, a subscriber profile is obtained from a home location register 24 and stored in the visitor location register 20. The subscriber profile includes trigger codes (referred to herein interchangeably as "triggers") which indicate in some fashion how the MSC is supposed to handle certain call events during a call involving the device 10. For example, if the device subscribes to a pre-paid calling plan, a trigger code associated with pre-paid calling may cause the MSC to signal to a service control point (SCP) 30 in a SS7 network 32 for call processing guidance associated with prepaid calling. Such triggers include an origination trigger and a termination trigger, both of which prompt the MSC 18 to signal to the SCP 30 when a call is originated by, or terminated to, the phone 10.

The MSC 18 obtains the subscriber profile from a home location register (HLR) 24 over a wireless service provider signaling network 22. The HLR 24 refers to a subscriber database 26 to obtain the subscriber information, including trigger codes applicable to the subscriber.

Consider the situation where the mobile phone 10 belonging to a Sprint subscriber seeks to place a call to a second mobile phone 10A, which is in communication with a second BTS 14A, BSC 16A and terminating MSC 18A. When the originating trigger is processed in the originating MSC 18, the call is triggered to the SCP 30 for call processing guidance. The SCP 30, which is operated by a carrier which also operates the MSC 18, is a processing entity which may be used to determine whether both the phone 10 and the phone 10A are both subscribers to the same carrier. In practical terms, suppose the phone 10 is owned by a Sprint subscriber, and Sprint operates the MSC 18 and other network infrastructure 14, 16, 20, 24, 22, 30, etc. The question then is whether phone 10A is also a Sprint subscriber phone. The methods of this disclosure allow for making such determination.

Figure 7:
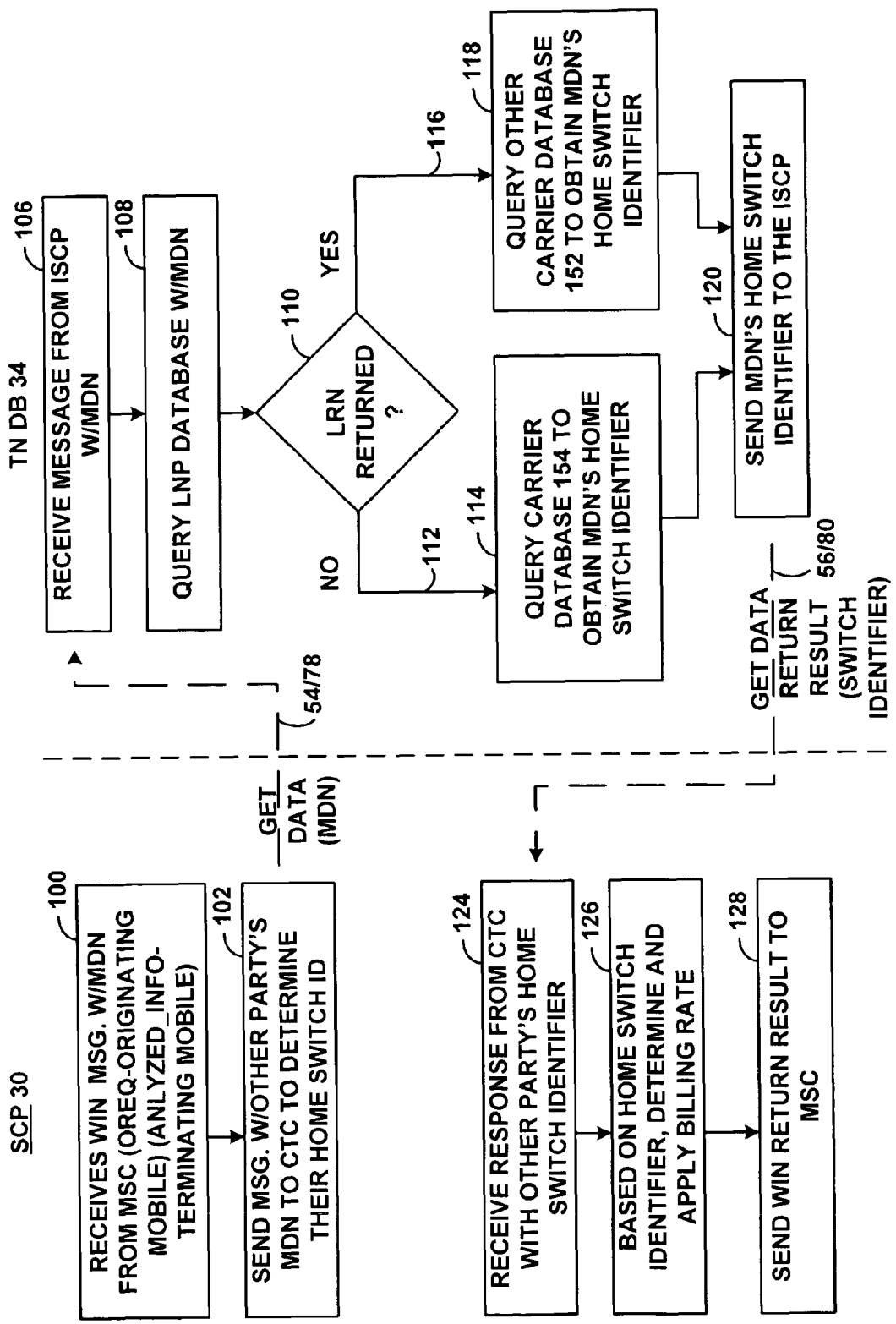
FIG. 7 is a flow chart showing the processing steps which occur in the SCP and telephone number database (TN DB) in FIGS. 5 and 6.

To identify the carrier for mobile phone 10A, the system of FIG. 1 may make use of one or more databases. One embodiment makes use of a master database 44 which relates mobile directory phone numbers to carriers, as discussed below. This database is provisioned and updated as necessary by the carriers 46, e.g., Sprint, Verizon, AT&T, T-Mobile, etc., and in particular updated to reflect local number portability occurrences when a subscriber switches from one carrier to another. In other embodiments, the method may make use of a LERG table 42, portability database 40, HLR 24, a telephone number database (TN DB) 34, and/or a caller ID-Name (CNAM) database 38, as described in the following sections. The TN DB 34 consists of databases shown in FIG. 8 and associated processor (not shown) providing software logic for accessing the databases and responding to queries from a Service Control Point 30 as indicated in FIG. 7.

The disadvantage in using these other databases is that more then one dip may be required. However, the advantage is that these are already existing databases. Consequently, the only change that needs to occur in the telephone network infrastructure of FIG. 1 to determine carrier for phone 10A is modification of the SCP 30 to implement the methods described in detail in this disclosure.

First Embodiment

Using Master Database

A first embodiment using a master database will now be described in conjunction with FIGS. 1 and 2. A master database 44 may be established with the cooperation of all the carriers 46, in which mobile phone directory numbers are stored in a table format with an identification of which carrier the phone subscribes to. One example of the table is shown in FIG. 2. The column 41 is a list of mobile phone directory numbers (MDNs) and the second column 49 lists the carrier identifiers for each of the mobile phone directory numbers in the column 41, in this instance in the form of a code or number, with the number 1 corresponding to Sprint, the number 2 corresponding to Verizon, etc., and other numbers assigned to the other carriers. As noted, the list is in some sense a "master list" in that it contains entries for all the mobile phones which subscribe to a plurality of carriers, and preferably all of them, including virtual network operators. Furthermore, to accommodate number portability and issuance of new phone numbers to different carriers, the database is updated on regular, e.g., daily basis. For example, when a user of a mobile phone subscribes to a new carrier and the number is ported to the new carrier, the database would be updated to change the carrier ID in column 49 for the particular phone number.

In a typical embodiment, a processing element in the telephony network infrastructure, such as the SCP 30 or the rating engine 36, consults the database 44 to determine whether a call between two mobile phones is between mobile phones which subscribe to the same carrier. For example, in response to a call origination trigger, the MSC 18 signals to the SCP and provides the mobile phone directory number to the SCP 30. The SCP 30 queries the database 44 and determines that the call is an intra-carrier call. The SCP 30 then takes appropriate action, such as returning a result to the MSC 18 advising that the call is a prepaid call so that the length of the call is not credited against airtime minutes (or whatever action is appropriate under the carrier's procedures for handling intra-carrier calls).

Second Embodiment

Using Location Routing Numbers

A second embodiment will now be described in conjunction with FIGS. 1, 3 and 4. This embodiment again relates to a telephony system (FIG. 1) in which a plurality of carriers provide telecommunications services, and provides a method of identifying the carrier for the phone 10A.

The method includes the steps of:

(a) identifying a directory number (MDN) of the phone 10A, e.g., in response to information provided by the MSC 18;

(b) consulting the LERG table 42 to determine which carrier was assigned a block of telephone numbers which includes the directory number identified in step (a);

(c) determining that the directory number is portable, e.g., by reference to the portability database 40 which lists numbers that are portable between carriers;

(d) obtaining a location routing number (LRN) for the phone 10A (also obtained from the portability database 40); and (e) comparing the location routing number to a list of location routing numbers associated with a carrier to and identifying the carrier from such comparison. For example, in step (e), Sprint may maintain a list of location routing numbers for all its subscribers (list not shown in FIG. 1). If the location routing number obtained in step (d) is in the Sprint list, then the call processing entity (e.g., SCP) implementing the method identifies the carrier for the phone as Sprint.

FIG. 3 is an illustration of one possible form of the LERG table, 42 of FIG. 1, with extraneous information which may be present in the table omitted. The idea with the table 42 is that certain blocks 39 of telephone numbers are assigned initially to particular wireless carriers, as indicated in the right hand column 43.

Figure 4:
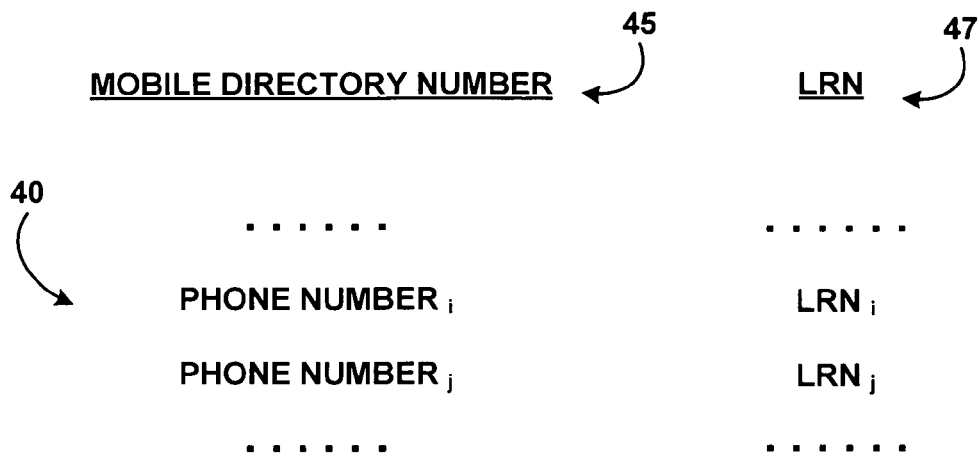
FIG. 4 is a more detailed illustration of one possible form of the portability database of FIG. 1, with extraneous information which may be present in the database omitted in order to not obfuscate the present disclosure.

FIG. 4 is an illustration of one possible form of the number portability database 40 of FIG. 1. Extraneous information which may be present in the database omitted. This database 40 lists mobile directory numbers for a particular carrier. Multiple number portability databases may exist, one for each carrier, or one database for all other common carriers than the carrier managing the MSC/SCP. Each database has a column 45 which lists the mobile directory numbers for all subscribers to the carrier and a second column 47 which lists the current Local Routing Numbers for each subscriber. Local Routing Numbers, also known as Location Routing Numbers (LRN) are 10-digit numbers that identifies a switching port for a local telephone exchange.

The steps involved in one representative implementation of this method may include the following:

1) a call being handled at an MSC 18 or 18A (FIG. 1) is triggered to the SCP 30. Such triggering could be via originating or terminating IN triggers.
2) The SCP 30 obtains information for the other end of the call from the message from the MSC, such as calling party MDN for terminations, called party MDN for originations.
3) The SCP 30 examines the LERG table 42 (FIG. 3) to see which carrier owns the MDN for the other end of the call (e.g., block of numbers which includes the MDN).
4) The SCP 30 looks up in a portability table (e.g., database 40 or in another database) if the number returned at step 2) is portable.
   a. If the number not portable, then the carrier of the other end of the call is known due to the result returned in step 3.
5) If number is portable, then SCP does a number portability dip by reference to the number portability database 40 (FIG. 4)
   a. If an error (e.g., no portability number returned), then number is not ported, and the carrier is known from the result returned in step 3.
6) If a local routing number (LRN) is returned in step 5, then the SCP 30 compares the local routing number to a list of local routing numbers for the MSCs for the carrier. This step may be performed with reference to a database which is maintained by the carrier.
   a. If the local routing number does not belong to the carrier, then it is not an intra-carrier call. The identification of the carrier for the local routing number can be determined by dips into number portability databases 40 maintained by the other carriers.
   b. If the local routing number does belong to the carrier, then it is an intra-carrier call.
7) For the case of virtual network operators, another dip could be performed to an HLR, or another SCP, or other database or to determine which virtual network operator the mobile subscribes to, by reference to either the MDN or the LRN of the mobile phone.

The methods in this embodiment are performed at the time a call is placed so that intra-carrier procedures can be invoked for the call, e.g. free minutes, etc. The method steps can be performed by any suitable processing entity in the telephone network infrastructure, such as for example the SCP 30.

In the event that it is determined that the call is not an intra-carrier mobile-to-mobile call, but rather a call from a land line of Carrier X to a mobile phone of Carrier Y, and the method is implemented in the SCP of the wireless Carrier Y, the method still has the advantage in that it can allow the Carrier Y to different ratings for certain carrier to carrier calls. For example, the Carrier Y may make a deal with Carrier X such that land line calls from Carrier X to Carrier Y pre-paid subscribers are rated at a 50% discount.

Third Embodiment

Using Home Location Register (24)

Another method for identifying the carrier for a mobile to mobile call uses a home location register 24 (FIG. 1) to determine the carrier for the phone 18A on the other end of the call. Consider an example where phone 10 initiates a call to phone 10A. The originating MSC 18 processes an initiation trigger and signals to the SCP, including in the signaling message the MDN of phone 10A.

This method includes steps of:

(a) identifying a directory number (MDN) of the mobile phone (from the signaling message from the MSC 18), (b) consulting a table (LERG table 42, FIG. 3) to determine which carrier was assigned a block of telephone numbers which includes the directory number;

(c) determining that the directory number is portable, by reference to a portability table or database (40); and (d) querying a home location register (HLR) 24 database for the phone 10A to determine the carrier. In particular, the HLR 24 will maintain in its database pertinent information for phone 10A including carrier identification. When the SCP 30 queries the HLR 24 the HLR 24 returns the carrier identification to the SCP. The SCP can now determine whether the call is intra-carrier or not and proceed accordingly.

As before, the steps (a)-(d) are performed at the time a call is placed to the phone 10A.

Fourth Embodiment

Name Database

In still another embodiment, the method uses a caller ID-name (CNAM) database to determine whether a call is an intra-carrier call. A CNAM database 38 (FIG. 1) basically is a list of mobile device numbers and identifies the subscriber name that is associated with each of the mobile device numbers.

In this embodiment the method of identifying an intra-carrier call between first and second mobile phones 10 and 10A, respectively, in real time comprising the steps of:

(a) triggering a call to a service control point 30;

(b) the service control point 30 determining the name of the subscriber associated with the second mobile phone 10A, by reference to the CNAM database 38 and using the MDN provided by the MSC in the triggering step (a); and (c) the service control point 30 querying a name database (not shown) for the carrier to which the first mobile phone 10 subscribes to determine whether the name determined in step (b) is in the name database. If the name determined in step (b) is in the database then the call is identified as an intra-carrier call. For example, a carrier serving subscriber phone 10, which is placing a call to phone 10A, consults a database listing all the names of its subscribers and if the name determined in step (b) is in the database, the call is an intra-carrier call.

Further Examples using Home Switch Identifier to Determine Carrier

Further examples of implementations of the method in the context of pre-paid origination calls (pre-paid subscriber initiates a call) and pre-paid termination calls (pre-paid subscriber receives a call) will be described now in conjunction with FIGS. 5-8.

Figure 5:
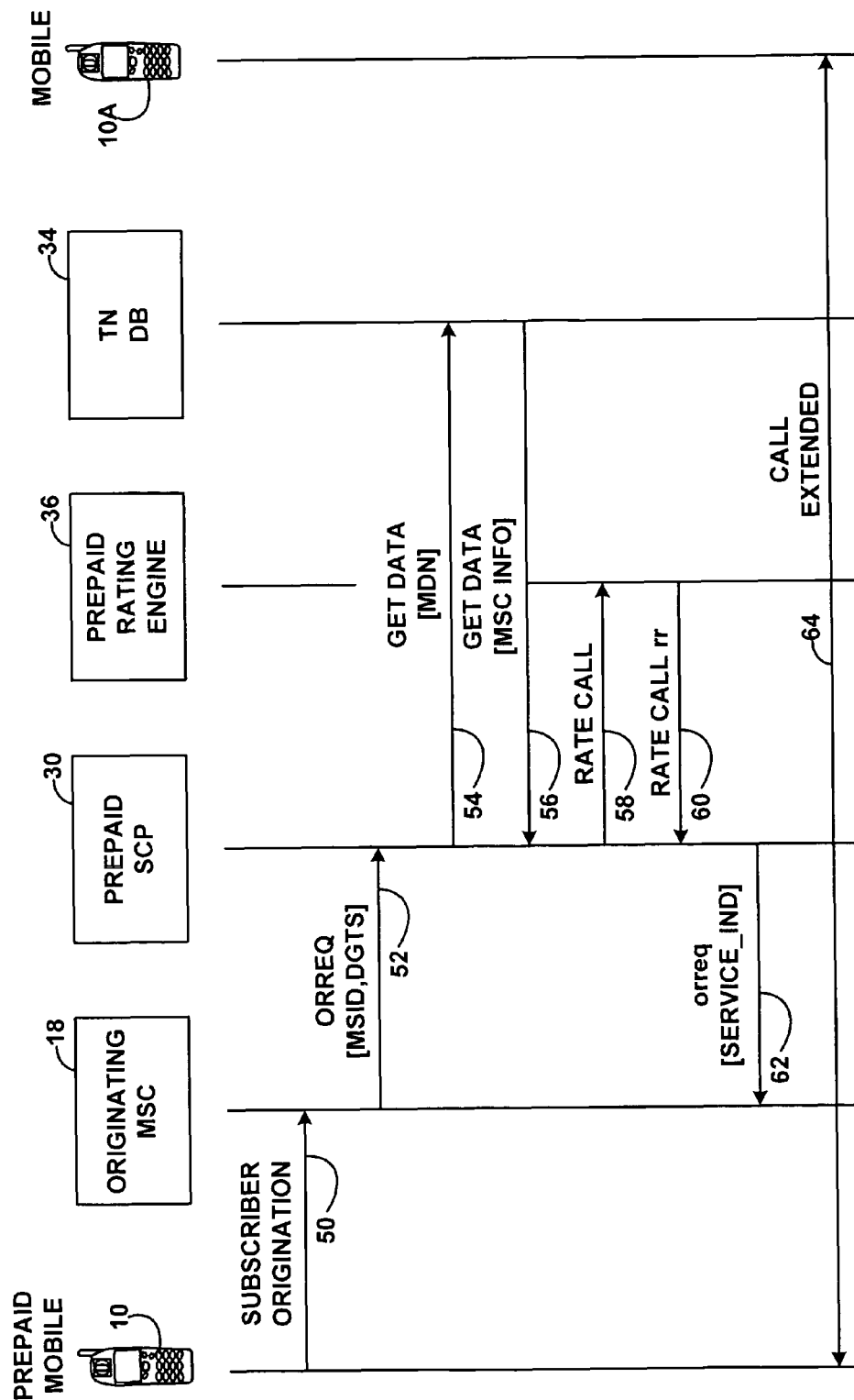
FIG. 5 is a diagram showing a flow of signals between the elements of FIG. 1 in a pre-paid origination scenario, including steps used to identify the carrier of the called party and application of preferential rates for the call.

Pre-Paid Origination (FIG. 5)

Consider now an example where pre-paid mobile phone 10 places a call to a mobile phone 10A, see FIGS. 1 and 5. FIG. 5 is a diagram showing a flow of signals between various elements of FIG. 1 in a pre-paid origination scenario, including steps used to identify the carrier of the called party phone 10A based on a home switch identifier and application of preferential rates for the call.

The processing proceeds as follows:

a. A prepaid subscriber requests service (50 in FIG. 5).
b. The MSC 18/VLR 20 identifies this subscriber as having prepaid services and routes the ORREQ to the SCP 30 via a designated point code, contained in the subscriber's profile (52 in FIG. 5). The ORREQ will contain the MSID & Digits Dialed (called phone 10A's MDN number).
c. The SCP 30 receives the ORREQ and sets up a SS7 query (GET DATA) to the TN DB 34 (FIG. 4) to procure information for proper rating (54 in FIG. 5). The GET DATA (MDN) invoke is received by the TN DB 34. The TN DB 34 will perform two internal checks to produce a unique MSC identifier for the phone 10A (see FIG. 8 and the discussion to follow).
d. The MSC information is sent from the TN DB 34 in a return result back to the SCP 30 (56 in FIG. 5).
e. The SCP 30 sends information pertaining to the originator 10A and the TN DB 34 (MSC ID) to the prepaid rating engine 36 (58 in FIG. 5). The rating engine 36 first verifies that the prepaid subscriber 10 has sufficient funds or balance in their prepaid account. Once verified to proceed, the rating engine 36 takes the unique MSC identifier and cross-references an internal database for proper rating, e.g., if the MSC ID indicates that the mobile phone 10A is also a subscriber to the same carrier as mobile device 10, then apply the appropriate rating. The identification of the carrier for phone 10A could also be identified using any of the four previous methods discussed previously.
f. The rating engine 36 sends information back to the SCP 30 to proceed with the call (60 in FIG. 5).
g. The SCP 30 sends a orreq return result message to the MSC 18, with instructions to complete the call (62 in FIG. 5)
h. Call path from calling party 10 to the called party 10A is completed (64 in FIG. 5).

Figure 6:
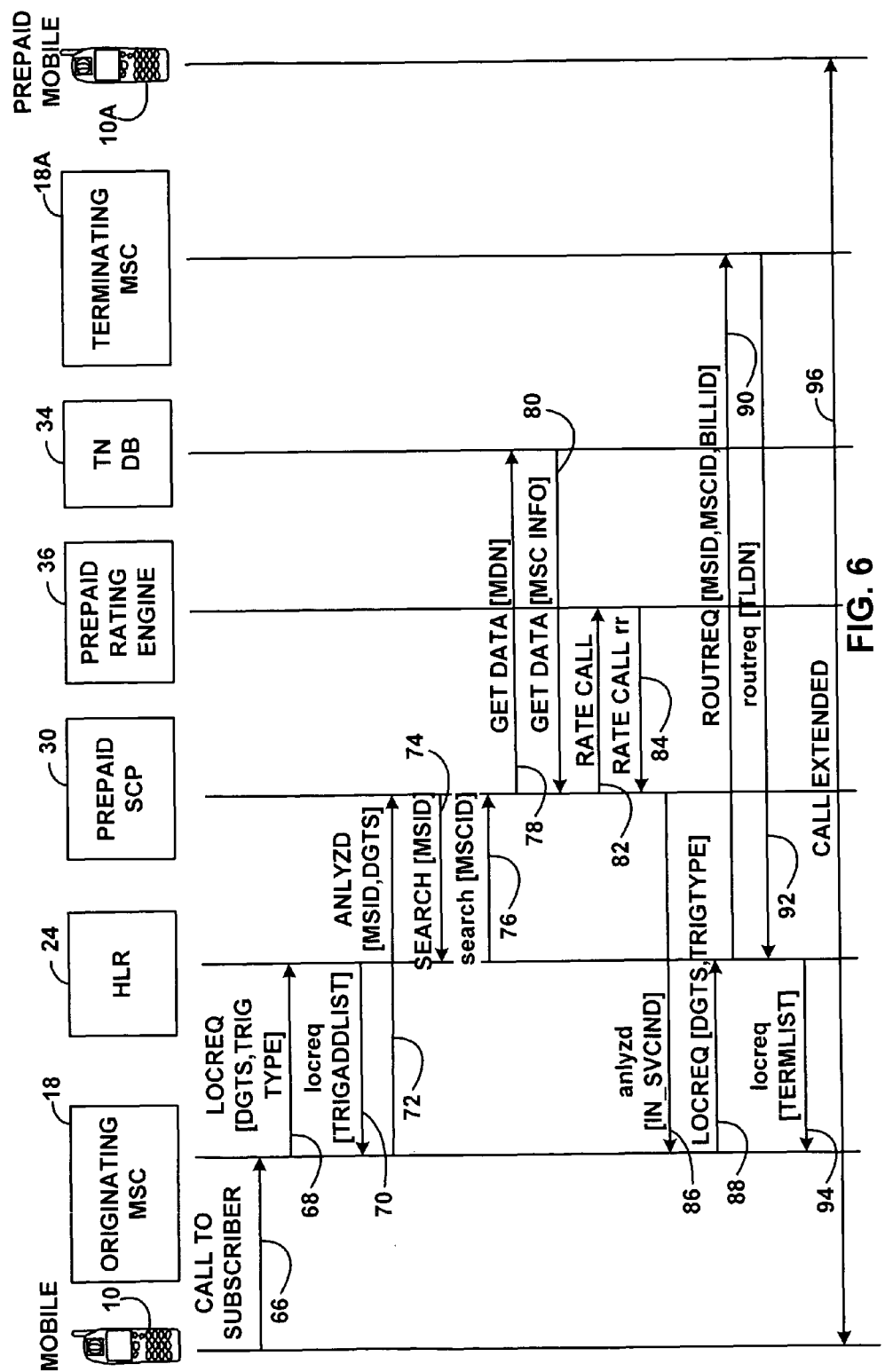
FIG. 6 is a diagram showing a flow of signals between the elements of FIG. 1 in a prepaid termination scenario, including steps used to identify the carrier of the calling party and application of preferential rates for the call.

Pre-Paid Termination (FIG. 6)

Consider now an example where mobile phone 10 places a call to a mobile 10A which has a pre-paid calling plan, see FIGS. 1 and 6. FIG. 6 is a diagram showing a flow of signals between various elements of FIG. 1 in a pre-paid termination scenario, including steps used to identify the carrier of the calling party phone 10 using a MSC home switch identifier and application of preferential rates for the call.

The method proceeds as follows:

a. A phone 10 requests service to a prepaid subscriber 10A in a non-local termination scenario (66 in FIG. 6).

b. The MSC 18 sends a LOCREQ invoke to the HLR 24 to get the called number subscriber information (68 in FIG. 6).
c. The locreq return result (70 in FIG. 6) informs the MSC 18 that the called party 10A has advanced services (prepaid in this case) and provides the MSC 18 with trigger and routing information.
d. The MSC 18 sends an ANLYZD invoke to the assigned prepaid SCP 30 with MSID, billing information and digits dialed (72 in FIG. 6).
e. Before rating begins, the SCP 30 must determine the last known location of the called party 10A party to determine time zone information. This is accomplished by sending a SEARCH invoke to the HLR 24 containing the called party mobile station ID (MDN) (74 in FIG. 6).
f. The HLR 24 will determine the last known location and will return the MSCID in the search return result (76 in FIG. 6).
g. Once the SCP 30 has the needed MSCID information it sets up a SS7 query (GET DATA) to the TN DB 34 to procure information for proper rating (78 in FIG. 6). The GET DATA (MDN) invoke is received by the TN DB 34. The TN DB 34 will perform two internal checks to produce a unique MSC identifier (See FIG. 8 and the discussion to follow).
h. The MSC information is sent from the TN DB 34, in a return result back to the SCP (80 in FIG. 6).
i. The SCP 30 sends information pertaining to the termination and the TN DB 34 information to the prepaid rating engine 36 (82 in FIG. 6). The rating engine 36 first verifies that the pre-paid subscriber 10A has sufficient funds or account balance. Once verified to proceed, the rating engine 36 takes the unique MSC identifier and cross-references an internal database for proper rating.
j. The rating engine sends information back to the SCP 30 to proceed with the call (84 in FIG. 6).
k. The SCP sends an anlyzd return result to the MSC 18, with instructions to complete the call (86 in FIG. 6).
l. The MSC sends a $2^{nd}$ LOCEQ to the HLR 24 to procure location information (88 in FIG. 6).
m. In a roaming scenario the HLR 24 will send a ROUTREQ information to the serving MSC 18A (90 in FIG. 6).
n. The serving MSC 18A sends back the routing information in the routreq return result (92 in FIG. 6).
o. The HLR 24 relays the routing information to the originating MSC 18 (94 in FIG. 6).
p. The calling party to called call is extended and the call proceeds (96 in FIG. 6).

Figure 8:
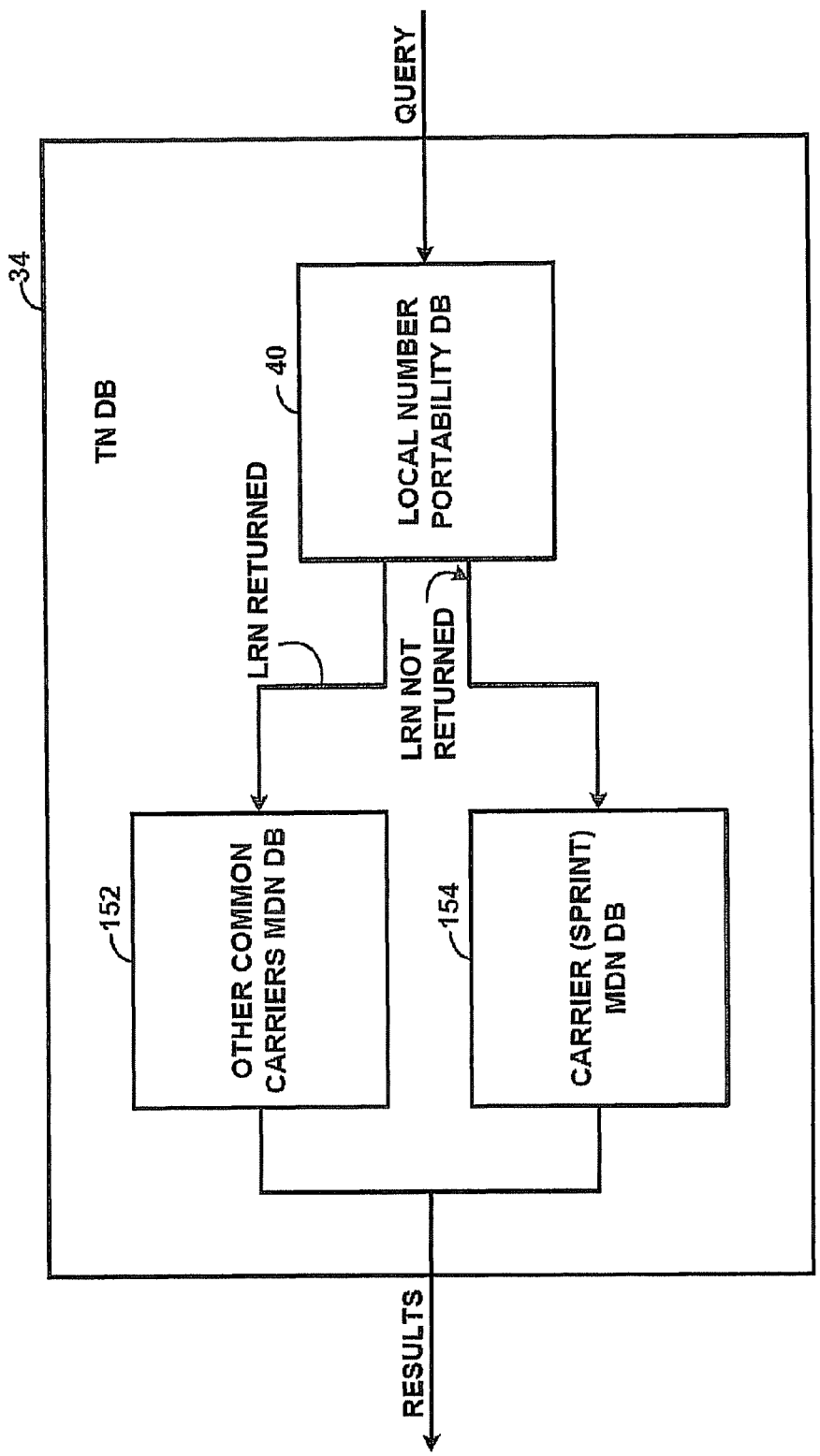
FIG. 8 is a block diagram of the databases of the TN DB of FIG. 1.

FIG. 7 is a flow chart showing the processing steps which occur in the SCP 30 and the TN DB entity 34 in FIGS. 5 and 6. FIG. 8 is a more detailed illustration of one embodiment of the TN DB 34 of FIG. 1.

As indicated at block 100, the SCP 30 receives a Wireless Intelligent Network (WIN) trigger message from the MSC 18 which contains the MDN of the other party to the call (the party whose carrier is not presently known). The step 100 can correspond to message 52 in FIG. 5 or message 72 in FIG. 6.

In block 102, the SCP sends a message with the other party's MDN to the TN DB 34 to determine the home switch ID (MSC ID). This block corresponds to message 54 in FIG. 5 or message 78 in FIG. 6.

The TN DB 34 then performs the processing steps 106, 108, 110, 114, 118 and 120 as shown in the right hand side of FIG. 7. The processing steps are the steps that occur between the time message 54 is received and message 56 is sent in FIG. 5 for a prepaid call origination, and are the steps that occur between the time message 78 is received and message 80 is sent in FIG. 6 for pre-paid call termination.

At block 106, the message 54 or 78 is received.

At block 108, the TN DB 34 queries the Local Number Portability (LNP) 40 database with the MDN number of the other party to the call (the party whose carrier is not yet known). In one embodiment shown in FIG. 8, the local number portability database 40 (FIG. 4) is local to the TN DB as indicated in FIG. 8. This database 40 contains all wireless MDNs. As explained above, the SCP 30 sends an Originating or Terminating MDN to the TN DB 34 to determine if the number has been ported in or out. If the MDN has been ported out or is foreign to the carrier managing the SCP/TN DB/MSC ("domestic carrier"), the results will produce a Local Routing Number (LRN). The logic in the TN DB 34 will need to instruct the LNP database 40 to send the second query to the "foreign" or "other common carrier" database 152 of FIG. 8. If the MDN is not ported or is owned by the domestic carrier, the LNP database 40 will return null results and the internal TN DB logic will need to send the second query to the domestic "carrier" database 154 of FIG. 8.

Thus, at block 110, the processing determines whether an LRN was returned at 108. If no number was returned, the processing proceeds along branch 112 and a query is made of a "domestic number" database 154 of FIG. 8 (basically the database of the carrier operating the TN DB/SCP/MSC). This database contains all carrier-owned MDNs. This query returns the MDN's home switch (MSC) identifier, i.e., MSC ID. This identifier is needs to be returned to the SCP for proper call rating (e.g., intra-carrier call rating).

If at block 110 a LRN was returned, then the processing proceeds along branch 116 and at block 118 a query is made of the other common carrier database 152 (FIG. 8) to determine the MDN's home switch identifier.

At block 120, the TN DB 34 sends the MDN's home switch identifier to the SCP 30, and such message is reflected at 56 in FIGS. 5 and 80 in FIG. 6. This home switch identifier (MSC ID) is used by the SCP for proper call rating, e.g., in the event of an intra-carrier call.

At block 124, the SCP 30 receives the get data return result message 56/80.

At block 126, based on the home switch identifier, the SCP will determine and apply the appropriate billing rate.

At block 126, a WIN return result message is returned to the MSC 18. This block corresponds to message 62 in FIG. 5 and message 86 in FIG. 6.

While a number of exemplary aspects and embodiments have been discussed above, those of skill in the art will recognize certain modifications, permutations, additions and sub-combinations thereof as being present in the disclosure. It is therefore intended that the following appended claims and claims hereafter introduced are interpreted to include all such modifications, permutations, additions and sub-combinations as are within their true spirit and scope.

We claim:

1. In a telephony system having a plurality of carriers providing telecommunications services, a method of identifying the carrier to which a user of a phone subscribes, comprising the steps of:
 (a) a signal control point of a first wireless carrier identifying a directory number of the phone;
 (b) consulting a table to determine which carrier in the plurality of carriers was assigned a block of telephone numbers which includes the directory number, wherein the table comprises a local exchange routing guide (LERG) table;
 (c) determining that the directory number is portable;
 (d) obtaining a location routing number for the phone;
 (e) comparing the location routing number to a list of location routing numbers associated with the first wireless carrier and identifying the carrier from such comparison, wherein if the location routing number is not in the list of location routing numbers associated with the first wireless carrier, identifying the carrier includes directly querying a number portability database maintained by a second wireless carrier using the location routing number, and
 (f) consulting a further database to determine the identity of a virtual operator the phone subscribes to,
 wherein the method is performed by the signal control point of the first wireless carrier in an advanced intelligent network.

2. The method of claim 1, wherein the steps (a)-(e) are performed at the time a call is placed to the phone.

3. The method of claim 1, wherein the phone is a mobile phone.

4. The method of claim 1, wherein steps (a)-(e) are initiated in response to an originating or termination intelligent network trigger event at a mobile switching center.

5. In a telephony system having a plurality of carriers providing telecommunications services, a method of identifying a carrier for a mobile phone having a mobile phone directory number (MDN), comprising the steps of:
 (a) obtaining the MDN from a service control point of a first wireless carrier in a wireless intelligent network,
 (b) querying a local number portability database with the MDN,
 (c) if the MDN is foreign to the first wireless carrier, returning a location routing number (LRN) from the query of the local number portability database, and directly querying a carrier MDN database maintained by a second wireless carrier with the LRN and returning a home switch identifier;
 (d) if the MDN is not foreign to the first wireless carrier, returning no LRN from the query of the local number portability database, and querying a database of the first wireless carrier and returning a home switch identifier;
 (e) returning the home switch identifier returned in either step c) or step d) to the service control point;
 (f) the service control point providing the home switch identifier to a rating engine to identify the carrier; and
 based on the home switch identifier, determining a billing rate,
 wherein the steps (a)-(d) are performed at the time a call is placed to the phone and are initiated in response to an originating or termination intelligent network trigger event at a mobile switching center.

\* \* \* \* \*